Figure 1:
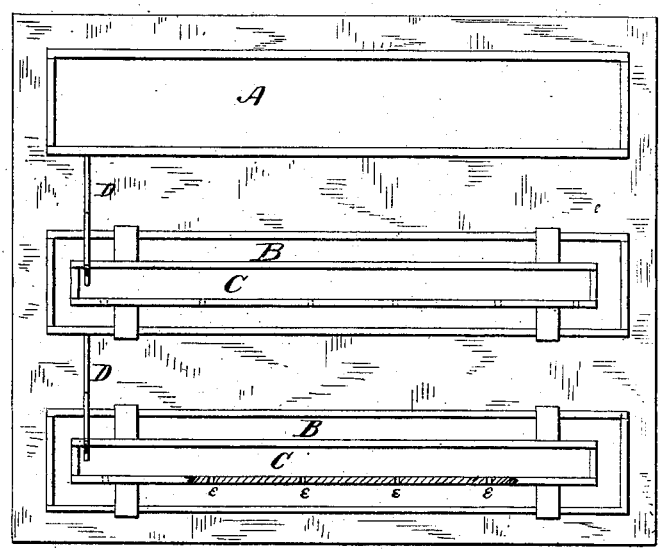

N. B. RICE.
Manufacture of Salt.

No. 237,600.　　　　　　　　Patented Feb. 8, 1881.

UNITED STATES PATENT OFFICE.

NATHANIEL B. RICE, OF EAST SAGINAW, MICHIGAN.

MANUFACTURE OF SALT.

SPECIFICATION forming part of Letters Patent No. 237,600, dated February 8, 1881.

Application filed April 4, 1878.

*To all whom it may concern:*

Be it known that I, NATHANIEL B. RICE, of East Saginaw, in the county of Saginaw and State of Michigan, have invented a certain new and Improved Process and Apparatus for the Manufacture of Salt; and I do hereby declare the following to be a full and exact description of the same, reference being had to the accompanying drawings, forming part of this specification, and to the letters of designation marked thereon.

The object of this invention is to improve the processes of washing, purifying, and preparing salt, and to provide an apparatus for carrying such improved processes into practice; and the invention consists, first, in the process of washing the salt with brine; secondly, in the process of washing the salt with brine and afterward decomposing the remaining calcic and magnesic chlorides with sodic carbonate, or other equivalent sodic salt, in a dry or pulverulent form; and, thirdly, in the mechanism for carrying the processes into practice, all substantially as I will proceed to describe.

In the manufacture of salt from brine all attempts heretofore to cleanse the salt by washing it in brine, so as to prevent dissolving and wasting it, have failed, because they have been made in the grainer, (the vat or vessel in which salt is precipitated,) where there could be but one washing, and where the brine was at once contaminated by mixture with the large quantity of mother-liquor, (bitter water,) which it is impossible to separate from the salt in that position. So, also, in such manufacture, salt in an impure condition and without any previous washing in brine has been treated with sodic carbonate in a dry state to decompose the earthy chlorides; but such practice has been abandoned on account of the large quantity of insoluble carbonates which its use in that form left in the salt.

By the inventions which I am about to describe all these difficulties are obviated, the salt is in a practical and economical manner thoroughly purified in the brine, and the application of the dry sodic carbonate or other equivalent sodic salt, for the purpose of decomposing the earthy chlorides, is rendered unobjectionable.

The invention, in its several parts, is carried into effect in substantially the following manner:

For washing, I use a box or vat of sufficient capacity to hold one lift of salt and brine, for washing it, in such position that salt when lifted from the grainer may be conveniently placed in it, and brine, on its passage from the settler to the grainer, may be easily conveyed to the salt in it and from that to the grainer. The box is perforated to allow free drainage, and the perforations may be closed in any convenient manner when it is desired to hold brine for washing salt. For convenience of location and economy of construction, a box made by adding sides and ends to the platform, to which salt is lifted from the grainer, with auger-holes for drainage, to be closed, when desired, with wooden plugs, answers an excellent purpose. Usually once in twenty-four hours the salt is lifted from the grainer and placed in this box, where, the holes being open, it has the benefit of drainage during the time of lifting the salt and preparing the grainer for the next filling. A part of the brine for the next filling is then conveyed, by any convenient arrangement of pipes, to the salt in the box, and by leaching, or by being stirred about in the brine, the salt is thoroughly washed. If the separation of the salt from the mother-liquor by lifting out and drainage has been very perfect, one washing may be sufficient; but two or more will give better results. After the salt, so washed in brine, has had the usual time for drainage, I add to it, in any convenient mixer, enough dry sodic carbonate, or bicarbonate, or sodic sulphate to decompose any calcic or magnesic chloride that may have remained, avoiding the complicated and expensive machinery for washing, the large space and loss of time for drainage, and consumption of fuel for drying involved in using the soda in solution. The quantity of sodic carbonate, bicarbonate, or sulphate to be used depends upon the quantity of calcic or magnesic chloride, or both, constituting the impurity or impurities of the salt under treatment, and varies with salt from different wells. It should always be as nearly as possible in the definite proportions of the chemical equivalents of the sodic carbonate, bicarbonate, or sulphate, and the calcic or magnesic chloride to be eliminated. In most of the Saginaw brines, for example, the proportions of the chlorides are two of calcium and one of magnesium; and as their chemical equivalents are nearly equal to that of sodic carbonate, being 317 and 318, it is convenient to use a pound of sodic carbonate to each pound of the chlorides in the salt under treatment. With the other decomposing agents mentioned, or with salt from other wells, the proportions should be varied accordingly. This rule will enable any practical chemist to work the process successfully, and no more definite rule can be given.

One of the many forms of apparatus in which the above-described processes may be carried into practice is represented in the accompanying drawings, in which—

Figure 2:
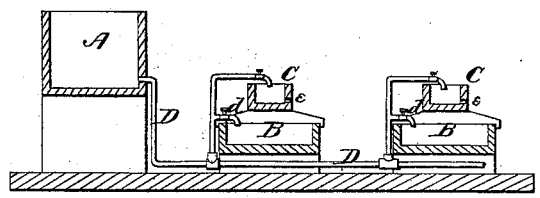

Figure 1 is a plan of the apparatus, and Fig. 2 a vertical section in line $x\ x$ of Fig. 1, similar letters being used to denote the same parts.

In said drawings, A indicates the "settler," in which the brine is evaporated to saturation, or thereabout; and B B are "grainers," in which the salt is precipitated, said parts being heated in any approved manner, and being of the usual construction.

C C are the perforated boxes or baskets hereinabove referred to, each being arranged, by preference, above its appropriate grainer, and being made somewhat narrower, so that the salt can be conveniently lifted from the grainer into the box, and the brine can be drawn from the box into the grainer.

D D are pipes, through which the brine is conducted or forced from the settler into the boxes or baskets, said pipes having preferably branches $d\ d$ leading into the grainers, and suitable valves by which the flow of brine can be controlled. The openings along the boxes or baskets are represented at $e\ e$.

I claim as my invention—

1. The combination, with the grainers, of the drain-boards or receivers, supported above such grainers, the settler, and the pipes from the settler discharging the saturated brine into the said receivers, substantially as described.

2. The process of first settling and then graining the brine, then removing the salt from the grainer to a box or platform, from which its liquors can be discharged into the grainer, then washing it on said platform with saturated brine from the settler, and allowing the brine, after its use for washing, to drain off and be discharged into the grainer, and then treating the washed and drained salt with a small quantity of dry pulverized bicarbonate of soda, to render the remaining deliquescent impurities insoluble, substantially as described.

In testimony that I claim the foregoing as my own I affix my signature in presence of two witnesses.

NATHANIEL B. RICE.

Witnesses:
D. W. PERKINS,
F. C. LILLENBACK.